United States Patent
Stephens, Jr.

(10) Patent No.: US 9,510,176 B2
(45) Date of Patent: *Nov. 29, 2016

(54) PORTABLE DEVICE EMERGENCY BEACON

(71) Applicant: III HOLDINGS 2, LLC, Wilmington, DE (US)

(72) Inventor: Michael C. Stephens, Jr., Los Gatos, CA (US)

(73) Assignee: III HOLDINGS 2, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,313

(22) Filed: Oct. 19, 2015

(65) Prior Publication Data
US 2016/0044482 A1    Feb. 11, 2016

Related U.S. Application Data

(63) Continuation of application No. 11/809,812, filed on Jun. 1, 2007, now Pat. No. 9,189,951.

(51) Int. Cl.
| | | |
|---|---|---|
| *H04M 11/04* | (2006.01) | |
| *H04W 4/22* | (2009.01) | |
| *G08B 21/02* | (2006.01) | |
| *G08B 25/01* | (2006.01) | |
| *H04W 4/02* | (2009.01) | |

(52) U.S. Cl.
CPC ............ *H04W 4/22* (2013.01); *G08B 21/0269* (2013.01); *G08B 21/0283* (2013.01); *G08B 25/016* (2013.01); *H04W 4/02* (2013.01)

(58) Field of Classification Search
CPC ... H04W 76/007; H04W 4/22; H04W 64/00; H04W 4/02; H04W 48/04; H04M 11/04; H04M 11/045; H04M 2242/04

USPC ............. 379/37–45; 455/404.1–404.2, 455/456.1–456.6, 457, 550.1, 90.1
See application file for complete search history.

(56) References Cited

U.S. PATENT DOCUMENTS

| | | | |
|---|---|---|---|
| 5,555,286 A | 9/1996 | Tendler | |
| 5,734,698 A * | 3/1998 | Kobayashi | ............... H04Q 3/42 |
| | | | 379/243 |
| 5,905,461 A | 5/1999 | Neher | |
| 6,028,514 A * | 2/2000 | Lemelson | .......... G08B 21/0211 |
| | | | 128/903 |
| 6,362,778 B2 | 3/2002 | Neher | |
| 6,388,612 B1 | 5/2002 | Neher | |
| 6,477,363 B1 | 11/2002 | Ayoub et al. | |
| 6,839,552 B1 * | 1/2005 | Martin | .................. G01S 5/0027 |
| | | | 455/404.1 |

(Continued)

OTHER PUBLICATIONS

Final Office Action on U.S. Appl. No. 11/809,812, mailed Nov. 18, 2010.

(Continued)

*Primary Examiner* — Anthony Addy
*Assistant Examiner* — Matthew Genack

(57) ABSTRACT

In one embodiment, an apparatus can include: (i) a location receiver configured to receive position signals, and to derive location information therefrom; (ii) one or more recognition modules configured to receive usage-related inputs, and to provide a pattern therefrom; and (iii) a processor configured to receive the pattern, and to provide the location information and an emergency indication. For example, particular embodiments can advantageously provide an emergency beacon using voice or other usage-related inputs to a cellular telephone.

20 Claims, 5 Drawing Sheets

(56) References Cited

U.S. PATENT DOCUMENTS

| | | | |
|---|---|---|---|
| 6,882,837 B2 | 4/2005 | Fernandez et al. | |
| 2002/0183069 A1 | 12/2002 | Myr | |
| 2003/0079040 A1* | 4/2003 | Jain | H04L 12/1886 709/238 |
| 2004/0072583 A1 | 4/2004 | Weng | |
| 2004/0185900 A1 | 9/2004 | McElveen | |
| 2004/0247086 A1* | 12/2004 | Menard | H04L 63/08 379/45 |
| 2005/0221796 A1* | 10/2005 | Pellegrino | G08B 13/19684 455/410 |
| 2006/0125626 A1* | 6/2006 | Govindaraj | G08B 25/004 340/531 |
| 2006/0223518 A1 | 10/2006 | Haney | |
| 2007/0057798 A1 | 3/2007 | Li et al. | |
| 2007/0133593 A1* | 6/2007 | Shankara | H04L 45/00 370/463 |

OTHER PUBLICATIONS

Final Office Action on U.S. Appl. No. 11/809,812, mailed Sep. 11, 2013.

Non-Final Office Action on U.S. Appl. No. 11/809,812, mailed Jan. 2, 2015.

Non-Final Office Action on U.S. Appl. No. 11/809,812, mailed Apr. 5, 2013.

Non-Final Office Action on U.S. Appl. No. 11/809,812, mailed Jun. 17, 2010.

Notice of Allowance on U.S. Appl. No. 11/809,812, mailed Jul. 16, 2015.

\* cited by examiner

PORTABLE DEVICE EMERGENCY BEACON

CROSS-REFERENCE TO RELATED PATENT APPLICATIONS

This application is a continuation of U.S. application Ser. No. 11/809,812, filed Jun. 1, 2007, which is herein incorporated by reference in its entirety.

FIELD

The present invention generally relates to the field of portable communication devices, and emergency notification therefrom.

BACKGROUND

In many emergency situations, it is difficult to convey a location and/or the fact that an emergency situation exists to someone who can help. For example, people calling "911" from an unfamiliar location sometimes have difficulty providing the operator with precise location information. Thus, valuable time may be lost in ascertaining the location to which emergency personnel should be deployed.

Many modern portable or mobile communication devices do include location receivers, such as those supporting the global positioning system (GPS). Using such devices, precise location information may be conveyed for an emergency situation. For example, 911 may be dialed, or some other emergency button may be pressed to indicate an emergency situation. However, such conventional approaches may not be equipped to detect emergency situations when such a button may not be readily accessible.

SUMMARY

Embodiments of the present invention relate to methods, apparatuses, structures, and/or devices for providing an emergency beacon from a portable device.

In one embodiment, an apparatus can include: (i) a location receiver configured to receive position signals, and to derive location information therefrom; (ii) one or more recognition modules configured to receive usage-related inputs, and to provide a pattern therefrom; and (iii) a processor configured to receive the pattern, and to provide the location information and an emergency indication.

In one embodiment, a method can include: (i) receiving programmed emergency keys in a portable device; (ii) monitoring usage of the portable device, and receiving position signals for deriving location information of the portable device; and (iii) transmitting an emergency indication and the location information when a match of at least one of the emergency keys to a lookup key representation of the usage occurs.

For example, particular embodiments can advantageously provide an emergency beacon using voice or other usage-related inputs to a cellular telephone. These and other advantages of embodiments of the present invention will become readily apparent from the description of example embodiments below.

EXAMPLE EMBODIMENTS

Figure 1:
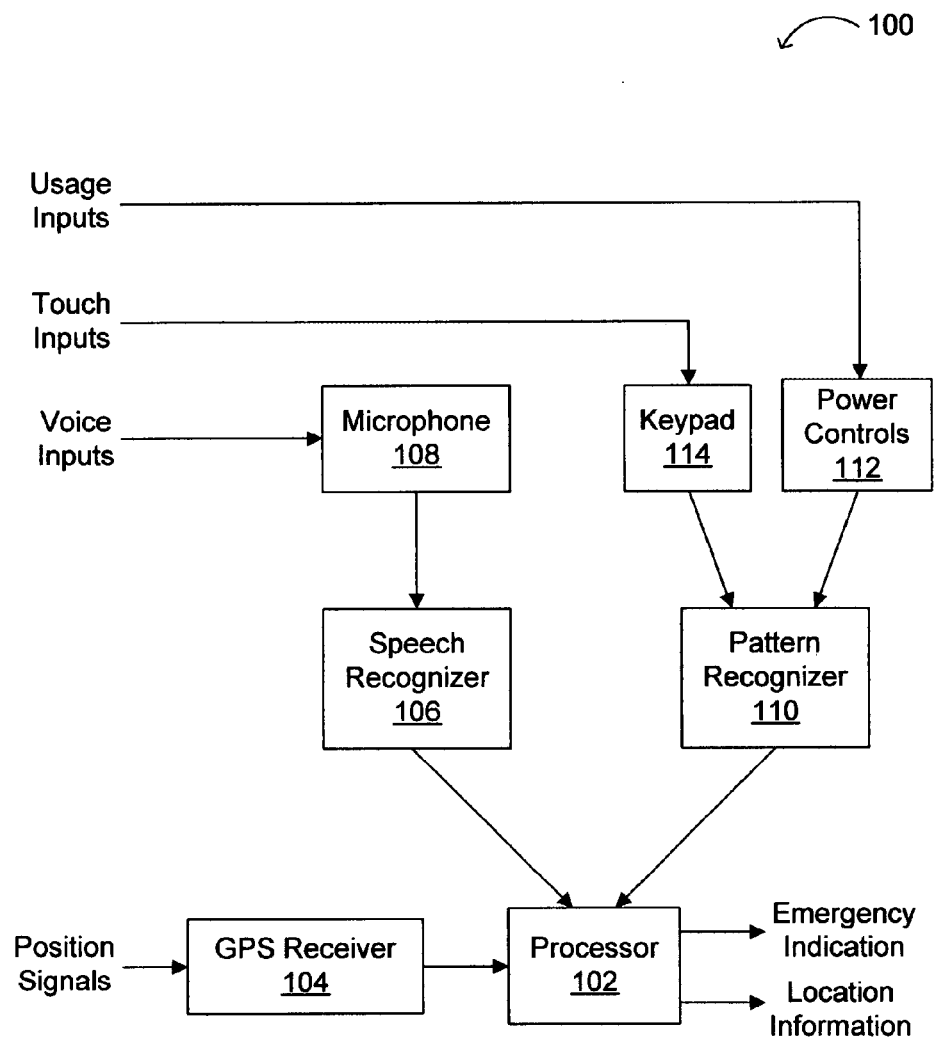
FIG. 1 is a diagram showing an example structure for determining an emergency indication and providing location information from a mobile device.

Reference will now be made in detail to particular embodiments of the invention, examples of which are illustrated in the accompanying drawings. While the invention will be described in conjunction with particular embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, etc. have not been described in detail so as not to unnecessarily obscure aspects of the present invention.

Some portions of the detailed descriptions which follow are presented in terms of processes, procedures, block arrangements, logic blocks, functional blocks, processing, and/or other symbolic representations of operations or device arrangements. These descriptions and representations are generally used by those skilled in the relevant arts to effectively convey the substance of their work to others skilled in the art.

It should be borne in mind, however, that all of the terms used herein are associated with the appropriate physical quantities, devices, methods, and/or signals, and are merely convenient labels so applied. Unless specifically stated otherwise and/or as is apparent from the following discussions, it is appreciated that throughout the present application, discussions utilizing terms such as "processing," "operating," "computing," "calculating," "determining," "manipulating," "transforming," "deriving," "displaying" or the like, refer to the action and processes of a computer or data processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

The present invention concerns an apparatus, such as a cellular telephone, and can include: (i) a location receiver configured to receive position signals, and to derive location information therefrom; (ii) one or more recognition modules configured to receive usage-related inputs, and to provide a pattern therefrom; and (iii) a processor configured to receive the pattern, and to provide the location information and an emergency indication.

In a further aspect of the invention, a method and/or algorithm can include: (i) receiving programmed emergency keys in a portable device; (ii) monitoring usage of the portable device, and receiving position signals for deriving location information of the portable device; and (iii) transmitting an emergency indication and the location information when a match of at least one of the emergency keys to a lookup key representation of the usage occurs.

Particular embodiments can advantageously provide an emergency beacon using voice and/or other usage-related inputs to a mobile or portable device. For example, particular embodiments can advantageously provide cellular telephone emergency beacon capability. The invention further relates to hardware and/or software implementations of the present structure, method, apparatus, and system. The invention, in its various aspects, will be explained in greater detail below with regard to example embodiments.

Referring now to FIG. 1, a diagram showing an example structure for determining an emergency indication and providing location information from a mobile device is indicated by the general reference character 100. Global positioning system (GPS) receiver 104 can receive position signals (e.g., via satellite transmission), and derive location information for or with processor 102. For example, processor 102 can be a digital signal processor (DSP), or any suitable general-purpose processor or processing/control module. In this fashion, precise real-time location information can be derived and conveyed from the mobile device. Further, other types of location determination approaches and/or formats, such as geographic location/privacy (GEO-PRIV), can be utilized for the location information.

In particular embodiments, an emergency situation can be detected by using one or more recognition modules. For example, speech recognizer 106 can be used to convey voice inputs via microphone 108. Speech recognizer 106 can be any suitable speech recognition engine or application (e.g., program or tool). As will be discussed in more detail below, a user can program specific "emergency keys" that can trigger an emergency indication when spoken by the user. For example, a user may program "I need help" and the user uttering that phrase can trigger the emergency indication in particular embodiments.

Also, such speech recognition tools can avoid mistaken utterances, such as those from another person (e.g., not the owner of the cellular phone), by utilizing user files that store voice characteristics for authorized phone users. Thus, speech recognizer 106 may not recognize the same utterance from an unauthorized user. In addition, a "lock out" or enable key, code, and/or button, or other suitable control mechanism (see, e.g., voice enable control in FIG. 2), can also be utilized such that no voice inputs are considered for generating an emergency indication unless this control is enabled.

Also in particular embodiments, other usage-related inputs can be used to determine an emergency situation. In one example, pattern recognizer 110 can receive inputs from keypad 114 and/or power controls 112. Keypad 114 can receive any suitable touch input (e.g., from a depressible button, or a touchscreen) from a user. Thus, a user may program a particular set of keystrokes (e.g., "11abc") that, when encountered, can indicate an emergency situation. Further, power controls 112 can be utilized in determining an emergency situation by receiving various device power-related usage inputs. For example, cellular telephone power being off for a period of 24 hours, or not being turned on/off twice in one day, can indicate an emergency situation. Any suitable type of power controls, power-related patterns, and/or thresholds can be set by a user for such emergency determinations.

Figure 2:
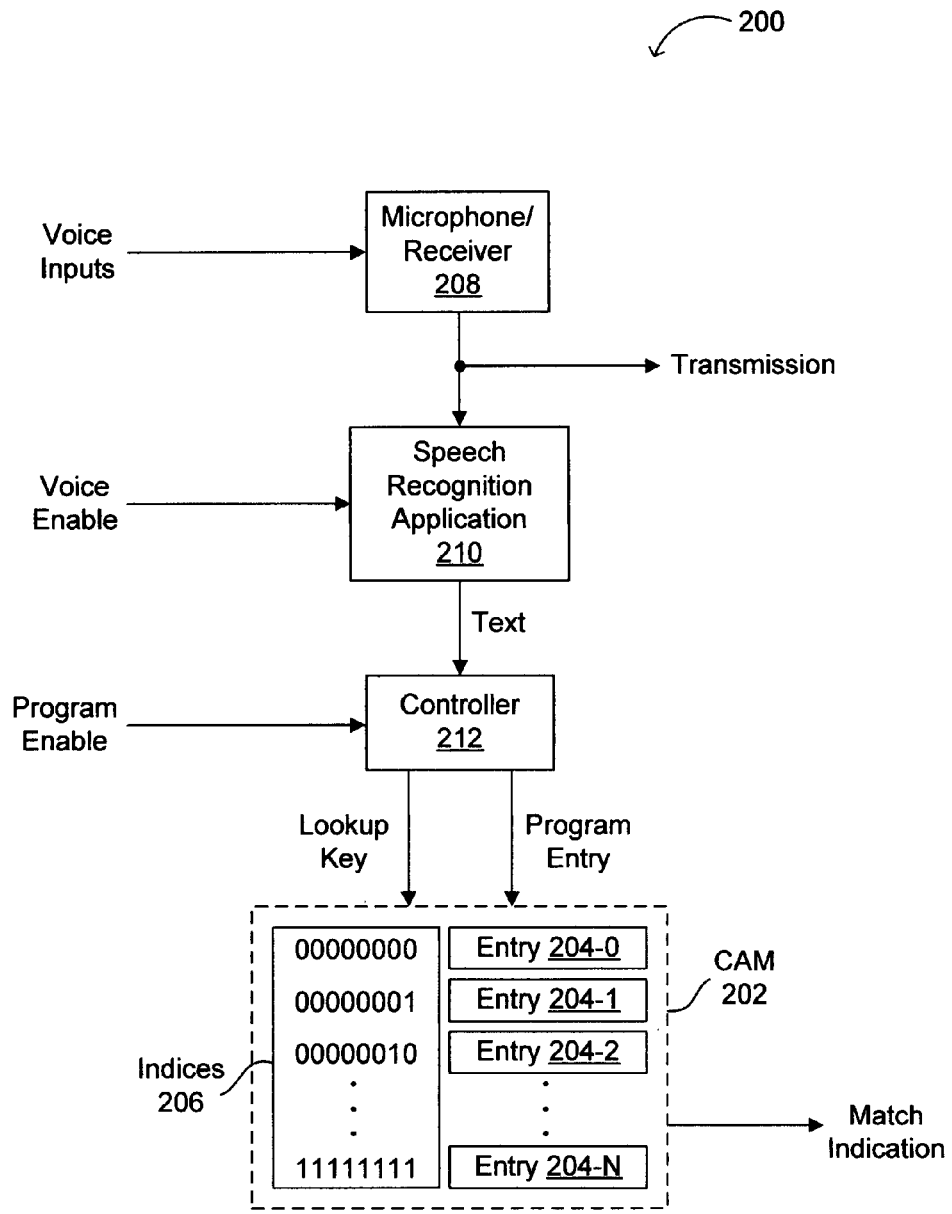
FIG. 2 is a diagram showing an example match indication generation from voice inputs to a mobile device.

Referring now to FIG. 2, a diagram showing an example match indication generation from voice inputs to a mobile device is indicated by the general reference character 200. Microphone/receiver 208 can receive voice inputs (e.g. from a cellular telephone user). Such inputs can also be passed for transmission to another user on the receiving end of a communication link. For emergency situation detection, microphone/receiver 208 can also provide voice inputs to speech recognition application 210 (e.g., when allowed by voice enable). Output from speech recognition application 210 can be in textual and/or binary format, and may be supplied to controller 212.

In one particular example, content-addressable memory (CAM) 202 can be utilized as a search engine for providing a match indication, thus indicating an emergency situation when appropriate. CAM 202 can include indices 206, where each index corresponds to a particular entry (e.g., entries 204-0, 204-1, 204-2, . . . 204-N). Further, such entries can be programmed to include emergency keys in particular embodiments. For example, during a program mode (e.g., when program enable is at a logical '1' or high level), voice inputs can be converted to a text/binary representation, and then stored in one or more entries of CAM 202. In this fashion, a user can designate one or more emergency keys by simply recording/storing an audio phrase in a mobile device.

In particular embodiments, normal operation of the portable device can include an ongoing monitoring of the particular voice inputs provided. Such voice inputs may be converted into text/binary format, and then provided to controller 212. During normal or non-program operation (e.g., when program enable is at a logical '0' or low level), converted voice inputs can be provided to CAM 202 as a lookup key. In particular embodiments, this lookup key can be compared against each entry, or concatenated entries as may be appropriate, to generate the match indication. For example, if a user has previously stored the "I need help" phrase into entry 204-2, when that user utters the phrase "I need help," a match occurs in CAM 202, and index 00000010, corresponding to entry 204-2, can be output with the match indication.

In this fashion, an emergency situation can be detected by the user uttering a given phrase. This may be particularly advantageous for situations when a person's cellular telephone has been taken by an assailant (e.g., to disallow that user from calling 911), but the telephone is still within an audio receiver range of the person. Thus, the person can shout "I need help" and the phone may automatically detect the emergency situation, then provide this indication plus real-time location information for appropriate help.

Also in particular embodiments, indices 206 may be utilized for classification of different levels or groups of emergencies. For example, some indices may correspond to stored emergency keys having a higher level of priority than other keys. Further, indices 206 may be organized into different groups, whereby different match indications can be provided. For example, one group may indicate a health emergency, while another may indicate an automobile breakdown. Any suitable categories, groups, and/or priority levels can be defined by a user for appropriate emergency, or non-emergency or other notification, classification. In this fashion, tailored emergency response can be automatically supported via the portable device.

Figure 3:
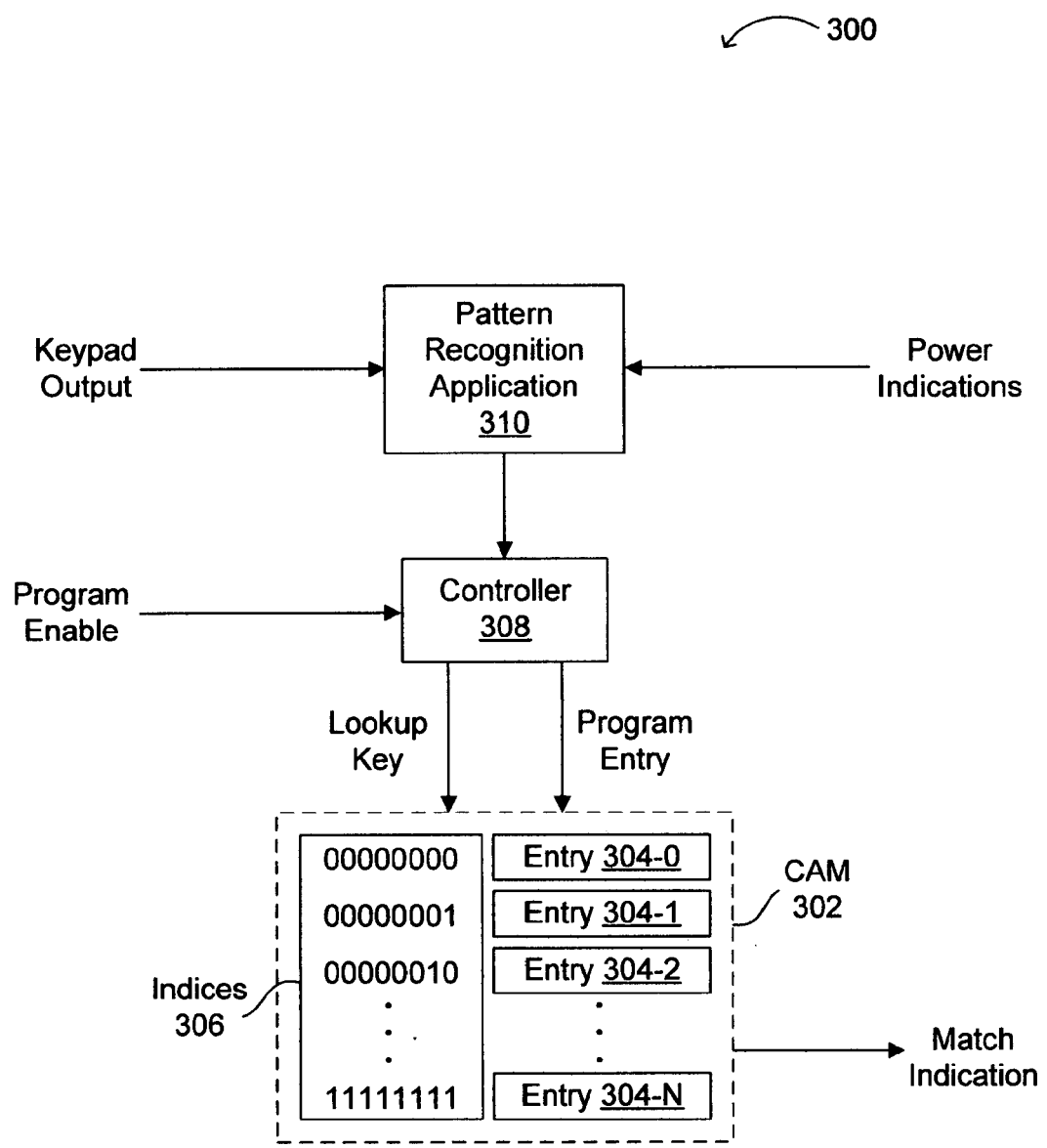
FIG. 3 is a diagram showing an example match indication generation from keypad and/or power usage indications via a mobile device.

Referring now to FIG. 3, a diagram showing an example match indication generation from keypad and/or power usage indications via a mobile device is indicated by the general reference character 300. In this case, pattern recognition application 310 can receive both a keypad output, as well as power indications. These may be passed to controller 308, which can provide a program entry in programming mode, or a lookup key in non-programming or normal operating mode. Similar to voice input detection, a content-addressable memory (e.g., CAM 302) can be utilized for matching purposes. Thus, keypad output and/or power indications can be converted and matched to one or more of entries 304-0, 304-1, 304-2, . . . 304-N, and a corresponding one of indices 306 can be provided in association with a match indication.

In particular embodiments, memories 202 (see FIG. 2) and 302 may be integrated together. In addition, either memory portion, or elements/entries thereof, may be implemented as any suitable type of memory, such as a static random-access memory (SRAM) utilizing a hash function. Further, memory elements that may be utilized as memories 202 and/or 302, or elements/entries thereof, can include non-volatile types, such as Flash electrically erasable programmable read-only memory (EEPROM). Any suitable type of non-volatile memory can be used in particular embodiments, and may be appropriate for emergency key storage.

In particular embodiments, any suitable keystroke pattern can be programmed into CAM 302. Examples of keystroke patterns that can be utilized as emergency keys include the familiar 911, or a secret code, such as a personal identification number (PIN). Examples of power indications that can be programmed as emergency keys include patterns of on/off (e.g., when a user turns off a cell phone once a day), whereby a change in this pattern can indicate an emergency situation. In addition, combinations of voice inputs, keystroke patterns, and/or power indications can also be programmed as an emergency key (e.g., by concatenating CAM entries). In this fashion, an emergency situation may be detected when a power indication threshold is met, and a particular phrase is uttered. This approach can protect against false emergency detections.

Figure 4:
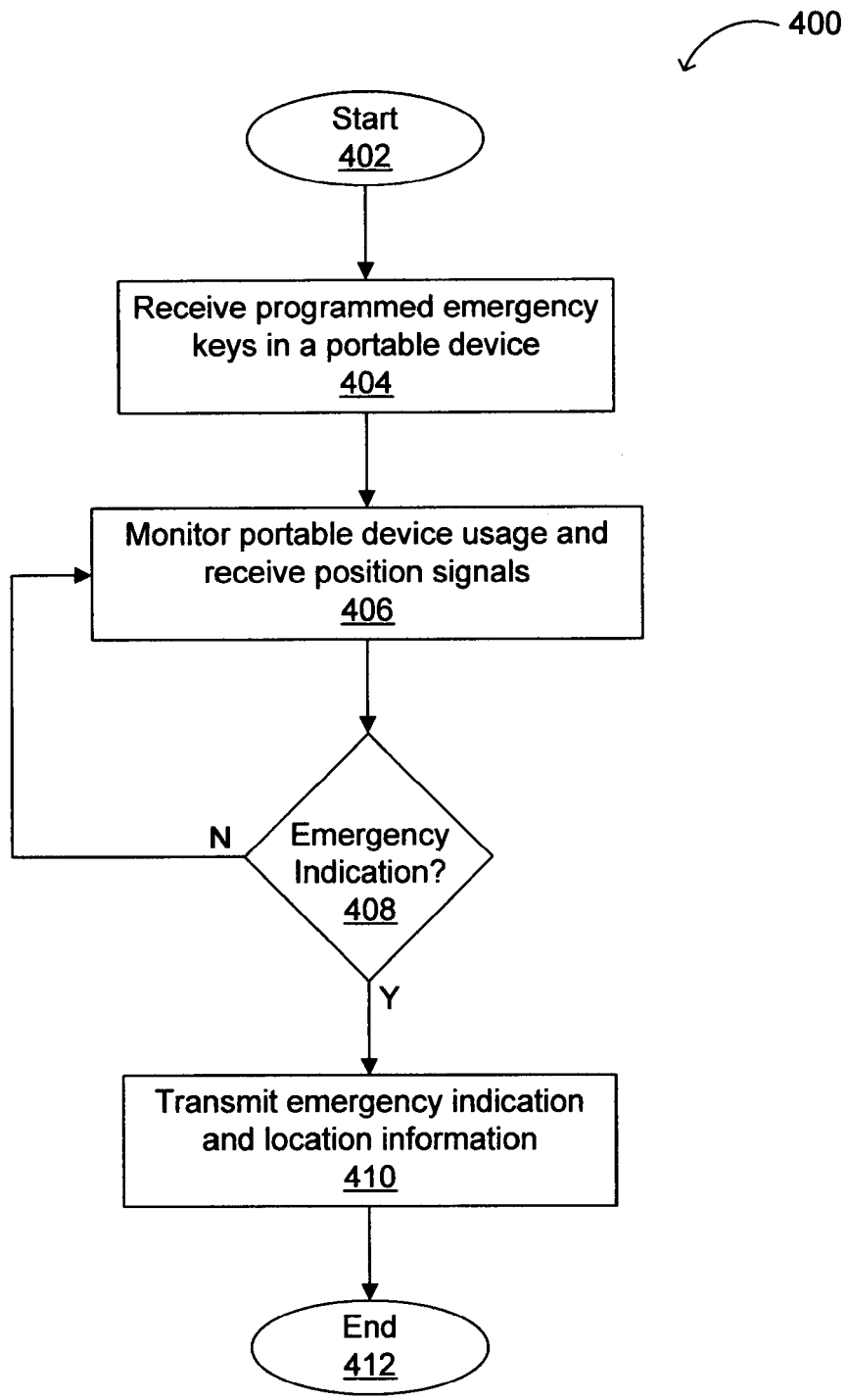
FIG. 4 is a flow diagram showing an example method of providing emergency indications with location information from a mobile device.

Referring now to FIG. 4, a flow diagram showing an example method of providing emergency indications with location information from a portable device is indicated by the general reference character 400. The flow can begin (402), and emergency keys may be programmed into the portable device (404). An ongoing monitoring of the portable device usage, along with receipt of position signals, can occur (406). If an emergency indication is asserted (408), that emergency indication, as well as location information, can be transmitted (410), and the flow can complete (412). For example, the emergency indication and location information can be sent to a web site for access by authorized users, such as concerned family members.

Figure 5:
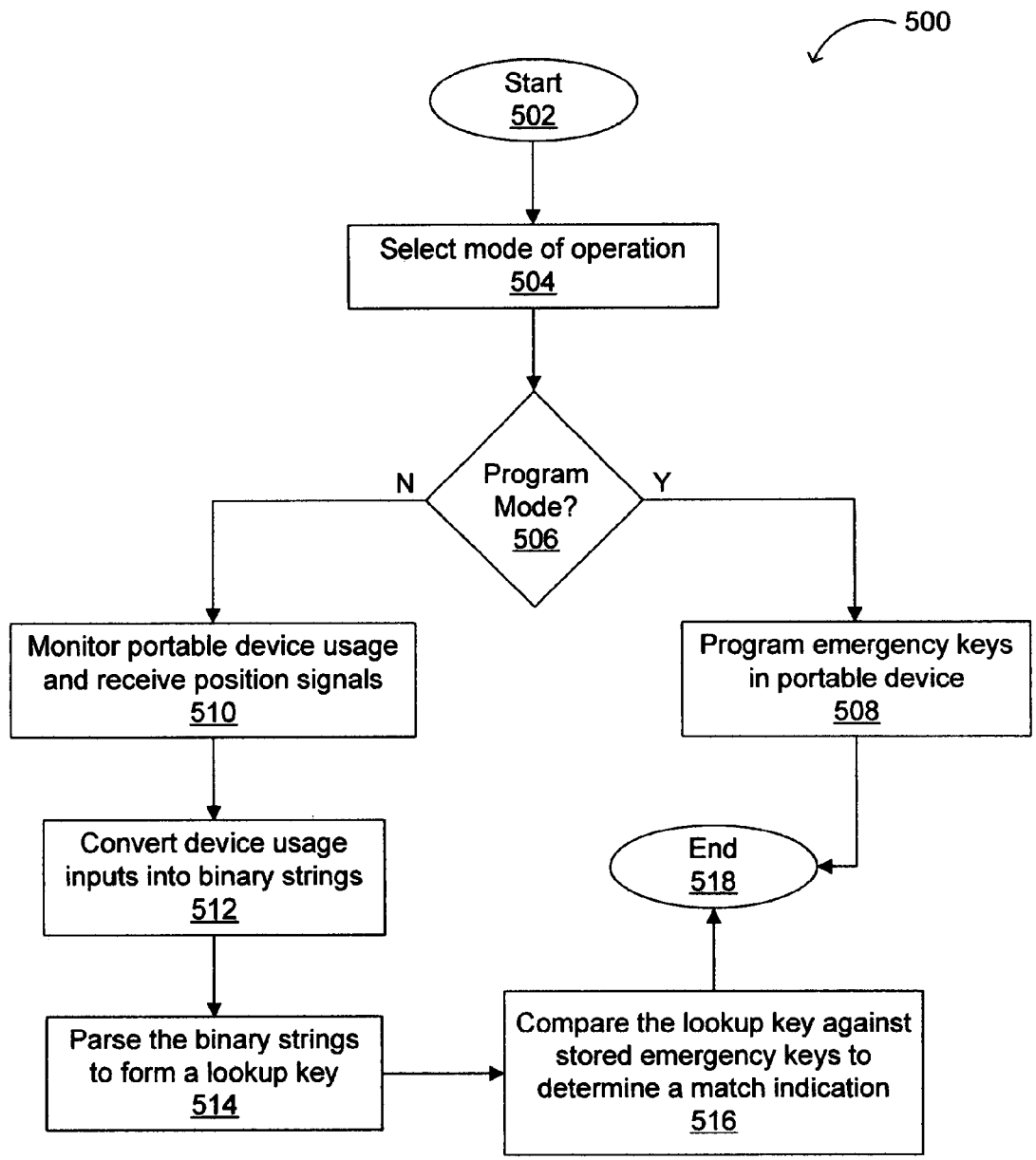
FIG. 5 is a flow diagram showing an example method of determining an emergency-related match indication.

Referring now to FIG. 5, a flow diagram of an example method of determining an emergency-related match indication is shown (500). The flow can begin (502), and a mode of operation can be selected (504). If a program mode is selected (506), emergency keys can be programmed into a portable device (508), and the flow can complete (518). However, during normal or non-program mode operation (506), portable device usage can be monitored and position signals can be received (510). Such device usage can be converted into appropriate binary strings (512). The binary strings can be parsed to form a lookup key (514). The lookup key can be compared against stored emergency keys to determine a match indication (516), and the flow can complete (518).

In this fashion, particular embodiments can advantageously provide an emergency beacon using voice or other usage-related inputs to a cellular telephone, or other portable device. Particular embodiments are suitable for a wide variety of emergency situations, such as those where standard 911 button pressing may not be feasible. In addition, other types of emergency, or other notification or non-emergency, keys can be utilized in particular embodiments. Thus, any suitable type of automatic detection and notification from a portable device can be accommodated in particular embodiments. Further, emergency indications and the like can be accompanied by an open communication channel such that another can listen to an ongoing situation giving rise to the emergency determination.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method comprising:
providing a first lookup key;
monitoring, by a pattern recognizer, a plurality of usage-related inputs of a portable device and providing a second lookup key therefrom;
determining a first match between the first lookup key and at least one of a plurality of programmed emergency keys such that the first match is only determined if voice inputs match an authorized user voice data stored as the at least one of the plurality of programmed emergency keys;
determining a second match between the second lookup key and at least one of a plurality of predetermined emergency patterns;
determining an emergency indication associated with the second match; and
transmitting the emergency indication and the location information from the portable device in response to said determining a second match.

2. The method of claim 1, wherein the first lookup key is based on voice inputs.

3. The method of claim 1, further comprising programming a plurality of emergency keys by recording a voice input or audio phrase.

4. The method of claim 1, further comprising receiving position signals using a global positioning system (GPS) receiver.

5. The method of claim 1, further comprising transmitting voice inputs received by a speech recognizer from the portable device to another device via a communication link.

6. The method of claim 5, wherein the speech recognizer is only configured to receive the voice inputs in response to a predetermined user control.

7. The method of claim 1, wherein said transmitting the emergency indication and the location information comprises sending the emergency indication and the location information to a web site that is only accessible by authorized users.

8. The method of claim 1, wherein the emergency indication comprises a high-level priority indication.

9. The method of claim 1, wherein the portable device comprises a cellular telephone.

10. An apparatus, comprising:
a processor configured to:
    derive location information of the apparatus;
    recognize speech including receiving voice inputs, providing a first lookup key therefrom, and monitoring the voice inputs;
    recognize a pattern including receiving a plurality of usage-related inputs and providing a second lookup key therefrom;
    determine a first match between the first lookup key and at least one of a plurality of programmed emergency keys such that the first match is only determined if voice inputs match an authorized user voice data stored as the at least one of the plurality of programmed emergency keys;
    determine a second match between the second lookup key and at least one of a plurality of predetermined emergency patterns;
    determine an emergency indication associated with the second match; and
    transmit the emergency indication and the location information from the portable device in response to determining the second match.

11. The apparatus of claim 10, wherein the processor is configured to only receive the voice inputs in response to a predetermined user control.

12. The apparatus of claim 10, wherein the processor is further configured to transmit the voice inputs received by the speech recognizer from the apparatus to another device via a communication link.

13. The apparatus of claim 10, wherein the processor is further configured to:
    receive a user voice input from the speech recognizer while the apparatus is in a voice programming mode; and
    store the user voice input as one of the plurality of programmed emergency keys associated with the first lookup key.

14. The apparatus of claim 10, wherein the usage-related inputs comprise a keystroke pattern of a plurality of keystrokes.

15. The apparatus of claim 10, wherein the usage-related inputs comprise a power usage pattern such that the second match is determined only if the apparatus is powered off in a way that deviates from a predetermined power pattern.

16. The apparatus of claim 10, further comprising a content-addressable memory (CAM), wherein the CAM is configured to have a program mode, wherein the plurality of predetermined emergency patterns can only be written to the CAM during the program mode, and wherein if the CAM is not in the program mode, the CAM can still be read or searched.

17. The apparatus of claim 10, wherein the emergency indication comprises a high-level priority indication.

18. The apparatus of claim 10, wherein the first and second lookup keys are used as a search key to determine the first and second matches.

19. A non-transitory computer-readable medium having instructions stored thereon that, upon execution by a computing device, cause the computing device to perform operations, wherein the instructions comprise:
    instructions to provide a first lookup key;
    instructions to monitor a plurality of usage-related inputs of a portable device and providing a second lookup key therefrom;
    instructions to determine a first match between the first lookup key and at least one of a plurality of programmed emergency keys such that the first match is only determined if voice inputs match an authorized user voice data stored as the at least one of the plurality of programmed emergency keys;
    instructions to determine a second match between the second lookup key and at least one of a plurality of predetermined emergency patterns;
    instructions to determine an emergency indication associated with the second match; and
    instructions to transmit the emergency indication and the location information from the portable device in response to determining the second match.

20. The non-transitory computer-readable medium of claim 19, further comprising instructions to program a content-addressable memory (CAM) wherein the CAM is programmed to have a program mode, wherein the plurality of predetermined emergency patterns can only be written to the CAM during the program mode, and wherein if the CAM is not in the program mode, the CAM can still be read or searched.

* * * * *